United States Patent [19]

Horton et al.

[11] Patent Number: 5,213,248

[45] Date of Patent: May 25, 1993

[54] BONDING TOOL AND ITS FABRICATION

[75] Inventors: Ralph M. Horton, Murray, Utah; James T. Hoggins, Plano, Tex.; Shih-Yee Kuo, Salt Lake City, Utah

[73] Assignee: Norton Company, Worcester, Mass.

[21] Appl. No.: 819,321

[22] Filed: Jan. 10, 1992

[51] Int. Cl.⁵ .............................................. B23K 37/00
[52] U.S. Cl. .................................... 228/44.7; 228/54
[58] Field of Search .................... 228/44.7, 54, 6.2

[56] References Cited

U.S. PATENT DOCUMENTS

| | | | |
|---|---|---|---|
| 3,948,429 | 4/1976 | Davies et al. | 228/44.1 A |
| 4,020,543 | 5/1977 | Pennings | 29/423 |
| 4,049,506 | 9/1977 | Gilding | 204/38 R |
| 4,058,246 | 11/1977 | Nicklaus | 228/44.7 |
| 4,405,074 | 9/1983 | Levintov et al. | 228/41 |
| 4,507,588 | 3/1985 | Asmussen et al. | 315/39 |
| 4,585,668 | 4/1986 | Asmussen et al. | 427/38 |
| 4,630,556 | 12/1986 | Asmussen et al. | 118/50.1 |
| 4,667,867 | 5/1987 | Dobbes et al. | 228/44.7 |
| 4,691,662 | 9/1987 | Roppel et al. | 118/50.1 |
| 4,925,701 | 5/1990 | Jansen et al. | 427/38 |
| 4,932,582 | 6/1990 | Une | 228/122 |
| 4,935,303 | 6/1990 | Ikoma et al. | 428/408 |
| 4,940,180 | 7/1990 | Martell | 228/122 |
| 4,943,488 | 7/1990 | Sung et al. | 428/552 |
| 4,961,958 | 10/1990 | Desphandey et al. | 427/38 |
| 4,976,324 | 12/1990 | Tibbitts | 175/329 |
| 4,981,568 | 1/1991 | Taranko et al. | 204/192.31 |
| 4,987,002 | 1/1991 | Sakamoto et al. | 427/34 |
| 5,079,102 | 1/1992 | Tanaka et al. | 428/656 X |

FOREIGN PATENT DOCUMENTS

| | | |
|---|---|---|
| 0032437 | 7/1981 | European Pat. Off. |
| 0435423 | 7/1991 | European Pat. Off. |
| 2818911 | 7/1978 | Fed. Rep. of Germany |
| 5026 | 1/1989 | Japan .................................. 228/44.7 |

OTHER PUBLICATIONS

Kerschner et al., IEEE Transactions On Components, Hybrids, and Manufacturing Technology, vol. CHMT-2 NO. 3, pp. 283-287, 1979.

"Ultrahigh Pressure Anvils", Literature On Sumitomo Electric Sumicrystal TAB, p. 14, Feb. 1990.

Primary Examiner—Kenneth J. Ramsey
Attorney, Agent, or Firm—Volker R. Ulbrich

[57] ABSTRACT

The disclosure is directed to a bonding tool for use primarily in thermo-compression bonding of electronic circuit components and to a method of making the bonding tool. In one form of the disclosure, a holder is provided and has a substrate mounted at an end thereof. The holder is adapted to receive a heating element. A polycrystalline diamond film is disposed on the substrate, the film preferably being deposited by chemical vapor deposition. In a disclosed embodiment the substrate is a material selected from the group consisting of polycrystalline diamond, cemented tungsten carbide, silicon carbide, cubic boron nitride, and tungsten. In a further form of the disclosure, a ceramic substrate is provided which has a favorable thermal conductivity property as well as substantial electrical conductivity sufficient to permit shaping by electrical discharge machining ("EDM").

32 Claims, 3 Drawing Sheets

BONDING TOOL AND ITS FABRICATION

FIELD OF THE INVENTION

This invention relates to bonding tools and their fabrication and, more particularly, to bonding tools used in the production of electronic circuits, such as in thermocompression bonding of leads to integrated circuit devices or chips.

BACKGROUND OF THE INVENTION

During the assembly of electronic circuits, such as integrated circuit chips, lead wires are bonded to contact pads on a chip in an automated operation that uses a bonding tool called a thermode. The leads may be in a machine-fed tape, and the bonding tool, heated with a heating element, is automatically pressed on the leads for a predetermined time to bond the leads to the pads. The temperature of the bonding tool tip, and the force it applies, results in the desired bond. The tool is then lifted, the next set of parts is moved into position, and the operation is repeated.

The bonding operation is preferably performed as quickly as possible to prevent unwanted heating of the chip, to minimize sticking between the tool tip and the leads, and to increase production speed. The tip of the bonding tool must be brought to an elevated temperature, and as it loses heat during each bonding cycle it must quickly be returned to the desired temperature for the next cycle. The bonding tool tip is also subjected to large compressive forces, so the structure thereof must be able to withstand such forces, without deforming or breaking, for many thousands of operating cycles. Materials such as titanium carbide and cubic boron nitride have been commonly employed as the tips of bonding tools.

The properties needed for a good bonding tool include excellent heat conductivity, strength, stiffness, and low coefficient of thermal expansion. Diamond, possessing these properties, has accordingly been used as the tip of lead bonding tools. In one prior art bonding tool design, a natural diamond is mounted in a metal matrix, such as a tungsten powder, that is held in an Inconel shank. A metal binder, such as silver or copper alloy, covers the diamond. The assembly is heated in a furnace to melt the binder, which infiltrates the matrix. Upon cooling, the binder solidifies, consolidates the matrix, and secures the diamond in place. The diamond is then machined, such as by grinding, into a desired tip shape. In another prior art approach, a diamond is pre-shaped into a desired tip configuration and then brazed to an Inconel shank which may optionally have an insert, such as of molybdenum. The cost of natural diamond, and the difficulty of securing it and forming it into a desired shape, are clear disadvantages of these types of bonding tools.

Kerschner et al., IEEE Transactions On Components, Hybrids, and Manufacturing Technology, Vol. CHMT-2 NO. 3, 1979, disclose a thermode having a polycrys-diamond tip attached to an Inconel body. The diamond tip contains a laser machined cavity to accommodate devices to be bonded.

EPA Publication No. 032,437 discloses a thermocompression bonding tool having a tip formed of a mass of synthetic polycrystalline diamond material sintered in a predetermined form and mounted on a cemented tungsten carbide substrate.

U.S. Pat. No. 4,932,582 discloses a method for preparation of a bonding tool. The superhard material of the tool can be single crystal diamond, diamond compacts, CBN compacts, cemented carbides, molybdenum and the like, and unified bodies of mixtures thereof. Reference is also made in this patent to prior art bonding tools using sintered metal powders holding a single crystal diamond head, and brazing of single crystal diamond to tungsten or molybdenum shanks.

U.S. Pat. No. 4,943,488 discloses a thermode which includes a "TSPCD" (temperature stable polycrystalline diamond) element bonded to a support or to an insert to be received in a support.

Although the described approaches have advanced the thermode art, there is substantial room for improvement in one or more of the following areas:

The use of sintered diamond compacts as a tip can result in thermally unstable structures and/or the presence of impurities which can cause sticking or other operational problems.

The forming of extremely hard thermode tips into the variety of shapes needed for different bonding jobs tends to be difficult and/or expensive.

Adherence of the thermode tip to a holder or to a substrate, and/or adherence of the substrate to a holder, may be inadequate for long term use.

The thermal conductivity, stiffness, and/or coefficient of expansion of the tip, substrate, and/or other portion of the holder may limit the efficiency of the bonding tool.

It is among the objects of the present invention to address these and other limitations of the prior art in the fabrication and structure of thermocompression bonding tools.

SUMMARY OF THE INVENTION

The present invention is directed to a bonding tool or thermode for use primarily in thermo-compression bonding of electronic circuit components and to a method of making the bonding tool. In one form of the invention, a holder is provided and has a substrate mounted at an end thereof. The holder includes means for receiving a heating element. A polycrystalline diamond film is disposed on the substrate, the film preferably being deposited by chemical vapor deposition. In a disclosed embodiment the substrate is a material selected from the group consisting of polycrystalline diamond, cemented tungsten carbide, silicon carbide, cubic boron nitride, and tungsten. In this embodiment, the diamond film is deposited on the substrate using a plasma deposition technique.

A diamond film has a number of advantages for use as a thermode tip. In addition to the recognized advantageous properties of the diamond substance [including its thermal conductivity, rigidity, long life, and resistance to wetting], the diamond film can be deposited on surfaces having predetermined shapes to avoid the difficulty of machining diamond to obtain different thermode tip configurations as in the case of natural diamond. Deposition of the diamond film on a polycrystalline diamond substrate, such as a sintered diamond substrate, is particularly advantageous. A diamond substrate facilitates the deposition growth of a diamond film of desirable quality. Further, the diamond film surface prevents substances, such as cobalt or other metals or impurities in the underlying substrate, from contaminating parts being bonded or causing undesired sticking. Also, the relatively close matching of the coefficient of expansion of the diamond film to that of the diamond substrate enhances the temperature performance and longevity of the bonding tool.

In accordance with a further form of the invention, a ceramic substrate is provided which has a favorable thermal conductivity property as well as substantial electrical conductivity sufficient to permit shaping by electrical discharge machining ("EDM"). Preferably, the substrate has a thermal conductivity of at least 60 W(m·°K)$^{-1}$ and an electrical resistance of less than 1000 ohm-cm. The electrical property makes it machinable by EDM. The shaping of the hard materials used for thermode substrates and/or tips is generally problematic, and it is advantageous to use a ceramic which can be shaped by EDM while still providing the thermal conductivity and rigidity necessary for a thermode substrate and/or tip.

Further features and advantages of the invention will become more readily apparent from the following detailed description when taken in conjunction with the accompanying drawings.

DETAILED DESCRIPTION

Figure 1:
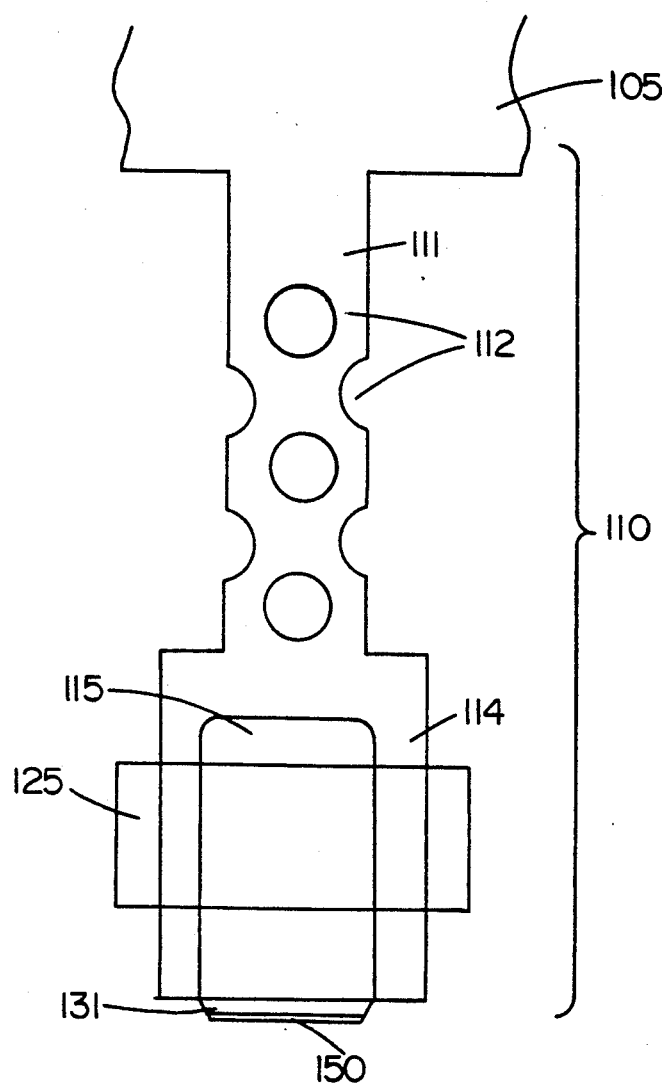
FIG. 1 is a cross-sectional view of a bonding tool in accordance with an embodiment of the invention.
Figure 2:
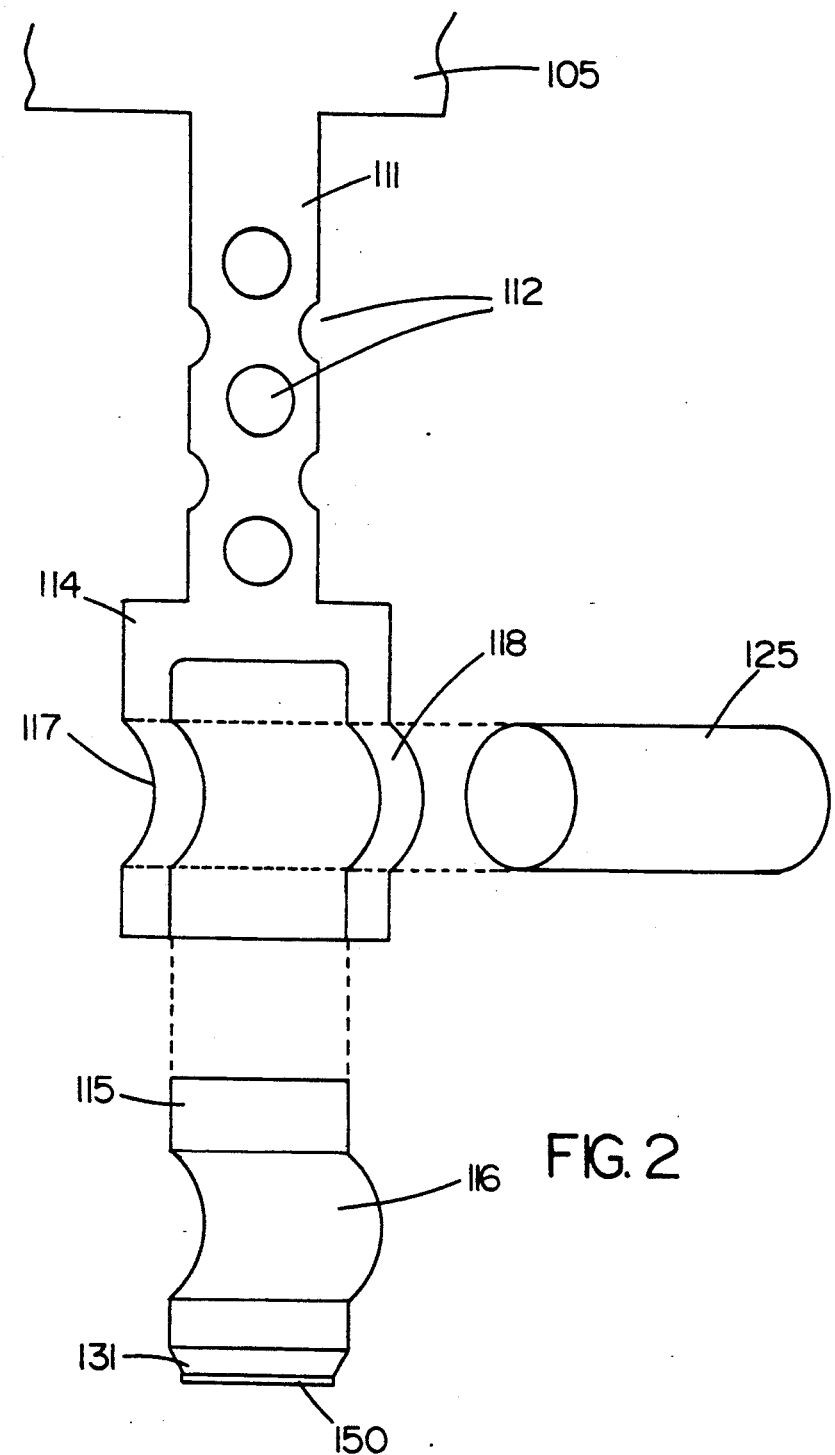
FIG. 2 is a cross-section exploded view, partially in perspective, of the bonding tool of the FIG. 1 embodiment.

Referring to FIGS. 1 and 2, there is shown a bonding tool in accordance with an embodiment of the invention. A holder 110 is provided and includes a shank 111 and head 114 that may be formed, for example, of a metal which has a relatively low thermal conductivity, such as the alloy Inconel. The shank 111 is shown mounted in a base 105 and having apertures 112 that conventionally serve to reduce heat loss up the shank. The holder includes an insert 115 which can be shrink fit or brazed in the recess of head portion 114 for intimate contact with the surface of the recess. In the present embodiment, the insert is provided with a cylindrical hole 116 which aligns with cylindrical apertures 117 and 118 in the recessed portion of the head for receiving a heating element 125 which may be of a conventional type and is coupled to a source of power, not shown.

The insert 115 preferably comprises a high elastic modulus material which is a good thermal conductor. In one embodiment hereof the insert comprises tungsten carbide, and the substrate 131 attached thereto is sintered polycrystalline diamond. A commercially available compact of sintered polycrystalline diamond on cemented tungsten carbide, for example Stratapax, sold by General Electric Company, could be used as the substrate and the insert, respectively, or portions thereof. Silicon-bonded polycrystalline diamond, with improved temperature stability, can also be used. The upper portion of the insert may be another material, for example copper or other material of high thermal conductivity.

Figure 3:
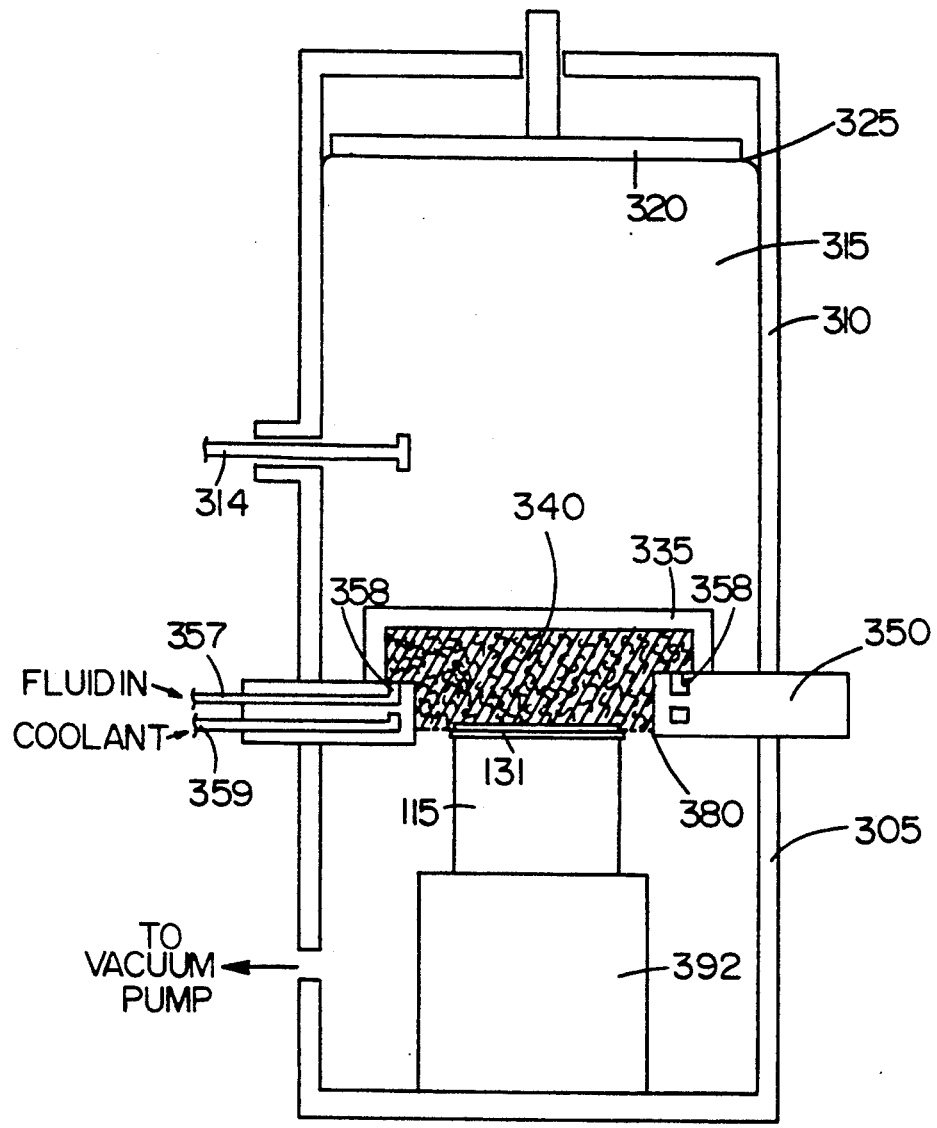
FIG. 3 is a diagram, partially in schematic form, of a microwave plasma chemical vapor deposition equipment that can be used in accordance with an embodiment of the method of the invention for fabricating a bonding tool.

The tip 150 is a layer of diamond film deposited on the substrate, preferably after polishing with a diamond paste, using a chemical vapor deposition technique. A plasma CVD method is utilized in the present embodiment. Plasma deposition equipment and techniques for depositing diamond film on a substrate are disclosed, for example, in copending U.S. Patent Application Ser. No. 614,900, assigned to the same assignee as the present application. Reference can also be made to U.S. Pat. Nos. 4,507,588, 4,585,668, 4,630,566, and 4,691,662. In one plasma deposition technique, microwave energy is used in generating the plasma, as illustrated in FIG. 3. A metal container 310 defines the walls of a microwave cavity 315, the top of which can be a plate 320, with finger stock 325, that serves as an adjustable sliding short. An excitation probe 314 is provided, and its position within the cavity can be made adjustable. A quartz chamber or bell jar 335, which is used to contain a plasma 340, is mounted on a ring-shaped base 350 to which a vacuum chamber 305 and the microwave cavity 310 are attached. A gas injector 357 is used to feed a hydrocarbon and hydrogen mix into the plasma forming region through apertures indicated at 358. A cooling line 359 can be used to circulate a coolant to cool the base, or cooling coils (not shown) can be provided. The insert 115, with substrate 131 thereon, is positioned on a support 392, and a disc-shaped metal grid 380, can be used to define part of the bottom of the microwave cavity, as shown. In operation, as the mixture of hydrogen and hydrocarbon is fed in, microwave energy in the cavity 315 creates the plasma 340, and polycrystalline diamond will be deposited on the surface of substrate 131. In a microwave plasma apparatus it is generally beneficial to heat the substrate, and this may be implemented by any suitable means, for example, with a susceptor plate. Also, if desired, an apertured BN plate and/or cover can be used on the insert (or on the entire holder) to protect edges from overheating in the microwave field. A plasma jet deposition apparatus, for example of the type described in the above-referenced copending U.S. Application, could alternatively be used for deposition of the diamond film, as could any other suitable deposition technique.

A diamond film has a number of advantages for use as a thermode tip. In addition to the recognized advantageous properties of the diamond substance [including its thermal conductivity, rigidity, long life, and resistance to wetting], the diamond film can be deposited on surfaces having predetermined shapes to avoid the necessity of machining diamond to obtain different thermode tip configurations as in the case of natural diamond. Deposition of the diamond film on a polycrystalline diamond substrate, such as a sintered diamond substrate, is particularly advantageous. A diamond substrate facilitates the deposition growth of a diamond film of desirable quality. Further, the diamond film surface prevents substances such as cobalt or other metals or impurities in the underlying substrate from contaminating parts being bonded or causing undesired sticking. Also, the relatively close matching of the coefficient of expansion of the diamond film to that of the diamond substrate enhances the temperature performance and longevity of the bonding tool. If desired, the deposited diamond film can be polished, such as by lapping.

Alternative substrate materials having high elastic modulus and good thermal conductivity can be utilized in conjunction with a diamond film tip. For example, the substrate 131 and/or insert 115 or portions thereof could be cemented-tungsten carbide (preferably, with a coating such as tungsten to separate the diamond from the cementing agent), tungsten, silicon carbide, or cubic boron nitride.

In accordance with a further form of the invention, a ceramic substrate is provided which has a favorable thermal conductivity property as well as substantial electrical conductivity sufficient to permit shaping by electrical discharge machining ("EDM"). Preferably, the substrate has thermal conductivity of at least 60 $W(m\cdot°K)^{-1}$ and an electrical resistance of less than 1000 ohm-cm. [The resistance encountered by the EDM equipment also depends on geometry of the workpiece, the value set forth being a general limit for typical geometries.] A suitable ceramic which exceeds these requirements is silicon carbide sintered with titanium diboride, which is sold by Carborundum Company as "Hexaloy ST". This material has good thermal conductivity and electrical resistivity in the range 0.1 to 10 ohm-cm at room temperature. The electrical property makes it machineable by EDM. The shaping of the hard materials used for thermode substrates and/or tips is generally problematic, and it is advantageous to use a ceramic which can be shaped by EDM while still providing the thermal conductivity and rigidity necessary for a thermode substrate and/or tip. After shaping, the ceramic itself can be used as a tip, such as by employing it as insert 115 (FIGS. 1, 2) or part thereof or attaching it to an insert, or a tip can be applied, such as a tip of polycrystalline diamond film as described above. Other electrically conductive ceramic materials which are suitable for use in the described manner are aluminum nitride doped with at least one dopant selected from yttrium oxide, calcium oxide, dysprosium oxide, and ytterbium oxide, and silicon carbide doped with at least one dopant selected from beryllium and beryllium oxide.

The invention has been described with reference to particular preferred embodiments, but variations within the spirit and scope of the invention will occur to those skilled in the art. For example, it will be understood that other tool and/or holder configurations and other heating means could be employed.

We claim:

1. A bonding tool, comprising:
a holder having a substrate mounted at an end thereof, said substrate comprising a compact of polycrystalline diamond particles, said holder including means for receiving a heating element; and
a polycrystalline diamond film disposed on said substrate to form a tip.

2. The bonding tool as defined by claim 1, wherein said diamond film is a film deposited by chemical vapor deposition.

3. The bonding tool as defined by claim 2, wherein said holder includes a shank portion, a head portion, and an insert connected to said head portion, said substrate being coupled with said insert.

4. The bonding tool as defined by claim 1, wherein said holder includes a shank portion, a head portion, and an insert connected to said head portion, said substrate being coupled with said insert.

5. A bonding tool, comprising:
a holder having a tip mounted at an end thereof, said holder including means for receiving a heating element;
said tip comprising a ceramic material having an electrical resistivity of less than 1000 ohm-cm and a thermal conductivity of at least 60 $W(m\cdot°K)^{-1}$.

6. The bonding tool as defined by claim 5, wherein said tip comprises a material selected from the group consisting of: silicon carbide sintered with titanium diboride; aluminum nitride doped with at least one dopant selected from yttrium oxide, calcium oxide, dysprosium oxide, and ytterbium oxide; and silicon carbide doped with at least one dopant selected from beryllium and beryllium oxide.

7. A bonding tool comprising:
a holder having a substrate mounted at an end thereof, said holder including means for receiving a heating element; and
a tip disposed on said substrate;
said substrate comprising a ceramic material having an electrical resistivity of less than 1000 ohm-cm and a thermal conductivity of at least 60 $W(m\cdot°K)^{-1}$.

8. The bonding tool as defined by claim 7, wherein said tip comprises a material selected from the group consisting of: silicon carbide sintered with titanium diboride; aluminum nitride doped with at least one dopant selected from yttrium oxide, calcium oxide, dysprosium oxide, and ytterbium oxide; and silicon carbide doped with at least one dopant selected from beryllium and beryllium oxide.

9. The bonding tool as defined by claim 8, wherein said tip comprises a polycrystalline diamond film deposited on said substrate.

10. The bonding tool as defined by claim 9, wherein said diamond film is a film deposited by chemical vapor deposition.

11. The bonding tool as defined by claim 7, wherein said tip comprises a polycrystalline diamond film deposited on said substrate.

12. The bonding tool as defined by claim 11, wherein said diamond film is a film deposited by chemical vapor deposition.

13. A bonding tool, comprising:
a holder having a tip mounted at an end thereof, said holder including means for receiving a heating element;
said tip comprising a ceramic material selected from the group consisting of: silicon carbide sintered with titanium diboride; aluminum nitride doped with at least one dopant selected from yttrium oxide, calcium oxide, dysprosium oxide, and ytterbium oxide; and silicon carbide doped with at least one dopant selected from beryllium and beryllium oxide.

14. A bonding tool, comprising:
a holder having a substrate mounted at an end thereof, said holder including means for receiving a heating element; and
a tip disposed on said substrate;
said substrate comprising a ceramic material selected from the group consisting of: silicon carbide sintered with titanium diboride; aluminum nitride doped with at least one dopant selected from yttrium oxide, calcium oxide, dysprosium oxide, and ytterbium oxide; and silicon carbide doped with at least one dopant selected from beryllium and beryllium oxide.

15. The bonding tool as defined by claim 14, wherein said tip comprises a polycrystalline diamond film deposited on said substrate.

16. The bonding tool as defined by claim 15, wherein said diamond film is a film deposited by chemical vapor deposition.

17. A method for making a bonding tool, comprising the steps of:
    providing a ceramic substrate having an electrical resistivity of less than 1000 ohm-cm and a thermal conductivity of at least 60 W(m·°K)$^{-1}$;
    electrical discharge machining a surface of said substrate into a predetermined shape; and
    mounting said substrate on a holder.

18. The method as defined by claim 17, further comprising the step of depositing a tip on said substrate.

19. The method as defined by claim 18, wherein said step of depositing a tip comprises depositing a film which substantially conforms in shape to said predetermined shape.

20. The method as defined by claim 19, wherein said step of depositing a tip comprises depositing a diamond film on said substrate.

21. The method as defined by claim 20, wherein said step of depositing a diamond film comprises depositing a diamond film by chemical vapor deposition.

22. The method as defined by claim 18, wherein said step of depositing a tip comprises depositing a diamond film on said substrate.

23. The method as defined by claim 22, wherein said step of depositing a diamond film comprises depositing a diamond film by chemical vapor deposition.

24. A method for making a bonding tool, comprising the steps of:
    providing a ceramic substrate comprising a ceramic material selected from the group consisting of: silicon carbide sintered with titanium diboride; aluminum nitride doped with at least one dopant selected from yttrium oxide, calcium oxide, dysprosium oxide, and ytterbium oxide; and silicon carbide doped with at least one dopant selected from beryllium and beryllium oxide;
    electrical discharge machining a surface of said substrate into a predetermined shape; and
    mounting said substrate on a holder.

25. The method as defined by claim 24, further comprising the step of depositing a tip on said substrate.

26. The method as defined by claim 25, wherein said step of depositing a tip comprises depositing a film which substantially conforms in shape to said predetermined shape.

27. The method as defined by claim 26, wherein said step of depositing a tip comprises depositing a diamond film on said substrate.

28. The method as defined by claim 27, wherein said step of depositing a diamond film comprises depositing a diamond film by chemical vapor deposition.

29. The method as defined by claim 25, wherein said step of depositing a tip comprises depositing a diamond film on said substrate.

30. The method as defined by claim 29, wherein said step of depositing a diamond film comprises depositing a diamond film by chemical vapor deposition.

31. A bonding tool, comprising:
    a holder having a substrate mounted at an end thereof, said substrate comprising a compact of polycrystalline diamond particles;
    a polycrystalline diamond film disposed on said substrate to form a tip; and
    means for coupling said substrate to a source for heating.

32. The bonding tool as defined by claim 31, wherein said diamond film is a film deposited by chemical vapor deposition.

* * * * *